United States Patent [19]
Gasper-Galvin et al.

[11] Patent Number: 5,227,351
[45] Date of Patent: Jul. 13, 1993

[54] SORBENT FOR USE IN HOT GAS DESULFURIZATION

[75] Inventors: Lee D. Gasper-Galvin, Washington, Pa.; Aysel T. Atimtay, Cankaya, Turkey

[73] Assignee: The United States of America as represented by the United States Department of Energy, Washington, D.C.

[21] Appl. No.: 668,521

[22] Filed: Mar. 13, 1991

[51] Int. Cl.$^5$ .................... B01J 29/16; B01J 20/16; B01J 20/10; B01D 53/34
[52] U.S. Cl. .................................... 502/60; 55/73; 423/230; 502/407
[58] Field of Search .................. 502/407, 64, 71, 77, 502/78, 29, 60

[56] References Cited

U.S. PATENT DOCUMENTS 4,925,631  5/1990  Harwood, Jr. et al. ............ 502/407
5,112,796  5/1992  Iannicelli ........................... 502/407

FOREIGN PATENT DOCUMENTS 0159056  8/1985  European Pat. Off. .

OTHER PUBLICATIONS

A Novel Supported Sorbent for Hot Gas Desulfurization, A. T. Atimtay et al, Preprints, Fuel Chemistry Division, American Chemical Society, vol. 35, No. 1, p. 104, 1990.
Hot Gas Clean-up: Zinc Ferrite Leads the Way, L. M. Day, Modern Power Systems, vol. 6, Issue 11, p. 71, Nov. 1986.
Copper Based Sorbent for Hot Gas Cleanup, M. Desai et al, Preprints, Fuel Chemistry Division, American Chemical Society, vol. 35, No. 1, p. 87, 1990.
Detailed Studies of Novel Regenerable Sorbents for High-Temperature Coal-Gas Desulfurization, M. Flytzani-Stephanopoulos et al, Seventh Annual Gasification & Gas Stream Cleanup Systems Contractors Mtg., DOE/METC-87/6079, vol. 2, p. 726, 1987.
Structural Property Changes in Metal Oxide Hot Coal Gas Desulfurization Sorbents, G. D. Focht et al, DOE/MC/21166-2163, 1986.
Performance of Zinc Ferrite Sorbent in Simulated Hot Coal Gas from the KRW Process Development Unit, T. Grindley, DOE/METC-85/4002, Feb. 1985.
Development of Zinc Ferrite Desulfurization Sorbents for Large-Scale Testing, T. Grindley et al, AIChE Annual Meeting, Session 114d, Nov. 1987.
Development and Testing of Regenerable Hot Coal-Gas Desulfurization Sorbent, T. Grindley et al, DOE/METC/16545-1125, 1981.
Removal of H$_2$S from Hot Gas in the Presence of Cu-containing Sorbents, T. Kyotani et al, Fuel, vol. 68, No. 1, Jan. 1989.
Metal Oxide/Zeolite Combination Absorbs H$_2$S, NASA Tech. Briefs, p. 81, Apr. 1989.
An Experimental Study of Oxidation of Zinc Sulphite Pellets, T. Rajeswara Rao et al, Chemical Engineering Science, vol. 37, No. 7, pp. 987-996, 1982.

Primary Examiner—Paul E. Konopka
Attorney, Agent, or Firm—David E. Breeden; Stephen D. Hamel; William R. Moser

[57] ABSTRACT

A multiple metal oxide sorbent supported on a zeolite of substantially silicon oxide is used for the desulfurization of process gas streams, such as from a coal gasifier, at temperatures in the range of about 1200° to about 1600° F. The sorbent is provided by a mixture of copper oxide and manganese oxide and preferably such a mixture with molybdenum oxide. The manganese oxide and the molybdenum are believed to function as promoters for the reaction of hydrogen sulfide with copper oxide. Also, the manganese oxide inhibits the volatilization of the molybdenum oxide at the higher temperatures.

9 Claims, 6 Drawing Sheets

SORBENT FOR USE IN HOT GAS DESULFURIZATION

BACKGROUND OF THE INVENTION

The present invention relates generally to solid sorbents for removing hydrogen sulfide values from hot process gas streams containing such values, and more particularly to a multiple metal-oxide sorbent supported on a silicon oxide substrate for removing hydrogen sulfide from a stream of hot gaseous products resulting from the gasification of coal. The United States Government has rights in this invention pursuant to the employer-employee relationship of the U.S. Department of Energy and the inventors.

The gasification o sulfur-bearing coal produces various sulfur-containing compounds in gaseous form with hydrogen sulfide being the major compound produced. The discharge of such hydrogen sulfide into the atmosphere causes grave environmental problems due to the conversion of the hydrogen sulfide to sulfur oxides which leads to the formation of acid rain as well as causing other environmental problems.

Clean-up procedures for removing essentially all of the hydrogen sulfide from process gas streams has been satisfactorily accomplished by using several different techniques. These techniques range from costly and thermally inefficient liquid scrubbers to the use of solid metal sorbents such as iron oxide, copper oxide, and zinc-based sorbents inducing zinc oxides, zinc ferrite, and zinc titanate. The utilization of these solid sorbents, especially the zinc-based sorbents, were found to be particularly efficient for removing hydrogen sulfide from relatively hot process gas streams such as provided by the gasification of coal. By removing essentially all the hydrogen sulfide values from the hot gas stream, the residual heat remaining in the gases could be used in a thermal expansion device such a s a gas turbine. This removal of hydrogen sulfide from such hot gas streams for use in hot gas utilization devices is not only important from an environmental standpoint but is required for inhibiting the deleterious degradation effects the hydrogen sulfide has upon metal surfaces contacted thereby.

The combination of a coal gasifier with a hot gas turbine has been found to be a highly efficient and economical system for deriving energy from coal, particularly in the form of electrical energy as provided by a gas turbine-electrical generator hook up. The efficiency of such combined-cycle systems increases as the gas temperature increases within a range from about 1200° to about 1600° F., preferably about 1400° to about 1600° F. or even higher. However, when attempting to remove hydrogen sulfide from coal-gasifier produced gases at temperatures greater than about 1200° F. and especially greater than about 1400° F., by using presently known metal and metal oxide sorbents, the results have not been particularly satisfactory. These sorbents, except for possibly copper oxide on a silicon oxide substrate, undergo considerable structural degradation and also exhibit a substantial loss in efficiency. For example, while zinc ferrite is capable of reducing the hydrogen sulfide content in gases produced by the gasification of coal to a level less than 10 ppmv at temperatures below about 1200° F., this sorbent undergoes considerable decrepitation, loss of pore volume, and reactivity at temperatures greater than about 1200° F. Zinc titanate is also a satisfactory sorbent at relatively high temperatures since the titanium oxide phase helps to stabilize the zinc oxide phase to reduce the volatilization thereof at temperatures greater than about 1290° F. However, even with this stabilization feature zinc titanate was found to have a relatively low capacity for hydrogen sulfide since the latter does not react with the titanium oxide. Thus, the capacity of zinc titanate for hydrogen sulfide is lower than that provided by zinc ferrite due to the dilution effect provided by the titanium oxide even though zinc titanate can withstand temperatures up to about 1350° F. while maintaining good structural integrity. Thus, the use of zinc titanate at such temperatures or higher is relatively limited since its sulfur capacity is relatively low, i.e., in the range of about 17-24 gram sulfur per 100 grams of sorbent compared to the 40 grams of sulfur per 100 grams of zinc ferrite.

Other previously known sorbents include copper manganate sorbents in bulk form which perform relatively well up to about 1400° F. where the sulfur capacity of this sorbent decreases rapidly, even in the absence of steam. Copper oxide on a support such as a zeolite was previously found to be a good sulfur sorbent at a relatively high temperature of about 1100° F. As described by the investigators in the publication "Removal of $H_2S$ From Hot Gas in The Presence of CU-Containing Sorbents", Fuel, Volume 68, No. 1. (1989), Takashi Kyotani et al, copper oxide was not considered to be an efficient sorbent because a surface sulphide layer formed on the outer surface of the copper oxide pellets and limited the utilization of the active copper. However, it was determined that almost complete copper utilization was achieved by combining copper oxide with supports such as silicon oxide and a zeolite.

Further testing of copper oxide sorbents supported on silicon oxide substrates has since been conducted at temperatures as high as 1600° F. As will be discussed below, these tests showed that while the copper oxide sorbent supported on silicon oxide did not undergo undesirable degradation at high temperatures, the efficiency and capacity of the sorbent was not believed to be adequate for for hot gas clean-up in combined-cycle systems.

SUMMARY OF THE INVENTION

Accordingly, it is a object of the present invention to substantially increase the efficiency and capacity of a copper oxide sorbent supported on a silicon oxide substrate by admixing with the copper oxide one or more additional metal oxides.

Another object of the present invention is to provide a multiple metal oxide sorbent on a silicon oxide support for efficiently removing hydrogen sulfide values from process gas streams, especially as provided by the gasification of coal, at elevated temperatures where previously known sorbents such as generally described above were rendered substantially ineffective or inefficient for extended use at such temperatures.

Another object of the present invention is to support a mixed metal oxide sorbent on a substantially silicon oxide zeolite and provide a sorbent arrangement which undergoes minimal structural degradation or loss of efficiency and capacity at temperatures in the range of about 1200° to about 1600° F., especially at temperatures nearer the high end of this temperature range.

Generally, the sorbent of the present invention for removing hydrogen sulfide values from a process gas stream at elevated temperatures comprises a mixture of copper oxide, an effective amount of manganese oxide to promote the reaction of hydrogen sulfide with the copper oxide, 0–40 weight percent molybdenum oxide, and a substrate of substantially silicon oxide supporting the mixture.

In a modification of the sorbent of the present invention, the sorbent comprises a mixture of copper oxide, molybdenum oxide in a concentration effective to promote the reaction of hydrogen sulfide with copper oxide, manganese oxide in a concentration effective to inhibit volatilization of the molybdenum oxide, and a substrate of substantially silicon oxide supporting the mixture.

Hydrogen sulfide values are removed from a stream of gaseous products resulting from the gasification of coal at a temperature greater than about 1200° F. by contacting of the stream of gaseous products with a sorbent provided by a silicon oxide supported mixture of copper oxide, an amount of molybdenum oxide effective to promote the reaction of hydrogen sulfide with the copper oxide at the selected temperature, and an amount of manganese oxide effective to further promote the reaction of hydrogen sulfide with copper oxide and/or to inhibit volatilization of the molybdenum oxide at the selected temperature.

Other and further objects of the present invention will become obvious upon an understanding of the illustrative embodiment and method about to be described or will be indicated in the appended claims, and various advantages not referred to herein will occur to one skilled in the art upon employment of the invention in practice.

Figure 1:
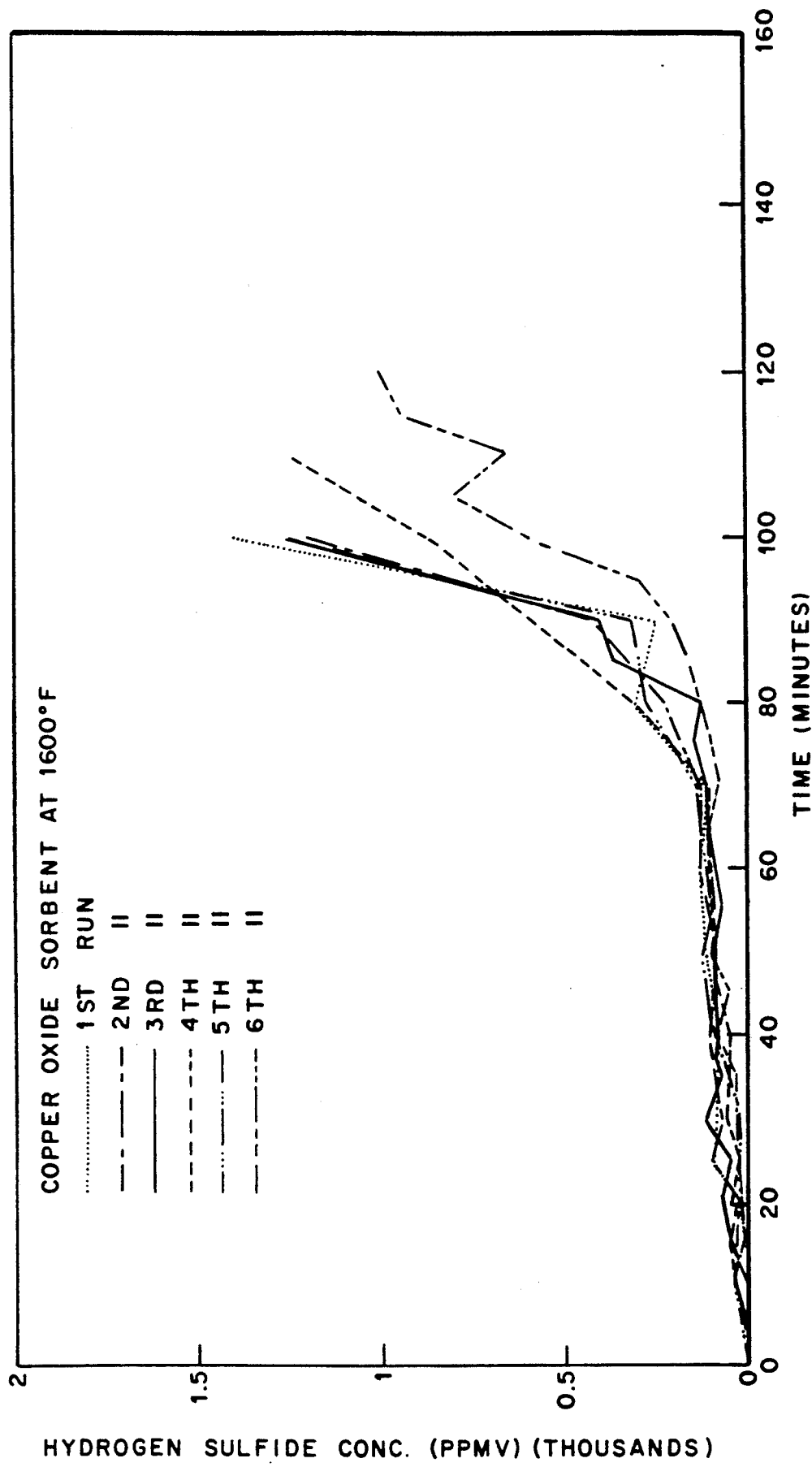
FIG. 1 is a graph illustrating the hydrogen sulfide breakthrough for a copper oxide sorbent supported on a zeolite substrate at 1600° F. for six sulfidation/regeneration cycles.

These graphs have been chosen for the purpose of illustration and description in order to best explain the principles o the preferred embodiments of the present invention and their application and practical use to thereby enable others skilled in the art to best utilize the invention in various embodiments and modifications as are best adapted to the particular use contemplated.

DETAILED DESCRIPTION OF THE INVENTION

As generally described above, the present invention is directed to a multiple-metal oxide sorbent supported on a substrate of substantially silicon oxide. This sorbent is particularly suitable for effecting the desulfurization of a process gas stream, especially a stream of gases emanating from a coal gasifier, at elevated temperatures in the range of about 1200° to 1600° F., preferably, in the range of about 1400° to about 1600° F.

The multiple-metal oxide sorbents of the present invention have sufficiently high sulfur capacities and sulfidation efficiencies for effecting the removal of a significant percentage of hydrogen sulfide from gases emanating from coal gasifiers at such high temperatures. These sorbents, as will be described in detail below, also have high attrition resistance and good crush strength for use in fluidized bed gasifiers. They also possess good regenerability and structural integrity at 1600° F. or higher in both oxidizing and reducing atmospheres.

The mixed metal oxide sorbent of the present invention is supported on a substrate formed of substantially silicon oxide and utilizes copper oxide as the principle or base oxide. The copper oxide is combined with manganese oxide to form a binary metal oxide sorbent and, preferably with manganese oxide and molybdenum oxide to form a ternary metal oxide sorbent. These sorbent arrangements provide a substantial improvement in sulfur removing efficiency and hydrogen sulfide capturing capability over that obtainable by using copper oxide alone on a silicon oxide substrate.

The substantially silicon oxide substrate utilized as the sorbent support in the present invention is preferably a porous zeolite containing greater than about 75 weight percent silicon oxide. Zeolites having a substantial concentration of silicon oxide are preferred since these zeolites posses good structural integrity at temperatures greater than those in the temperature range envisioned for the use of the sorbents of the present invention and also provide an excellent porous substrate material for supporting the mixed oxide sorbent. The zeolites possess relatively large surface areas so as to provide the sorbent supported thereby with a surface area of at least about 250 m$^2$/g which is significantly greater than the about 2–5 m$^2$/g for a similar sorbent in bulk form. In bulk form the metal oxide sorbents of the present invention would be relatively inefficient since the hydrogen sulfide must diffuse through the metal oxide lattice. However, by using zeolites for supporting the sorbents the hydrogen sulfide has access to the metal oxides through the zeolite pore structure.

Zeolites useful for supporting the mixed oxide sorbent of the present invention are commercially available. The preferred zeolite is one containing greater than 99 wt/% silicon oxide. Such a zeolite is commercially available as "SP-115" obtainable from Union Oil Products. Alternatively, zeolites such as "LZ-Y20" having a silicon oxide content greater than 75% wt/% and obtainable from Union Oil Products or zeolites identified as "T-1571" (93 wt/% silicon oxide) obtainable from Union Carbide, may be satisfactorily used as the substrate for supporting the mixed oxide sorbent of the present invention.

Figure 2:
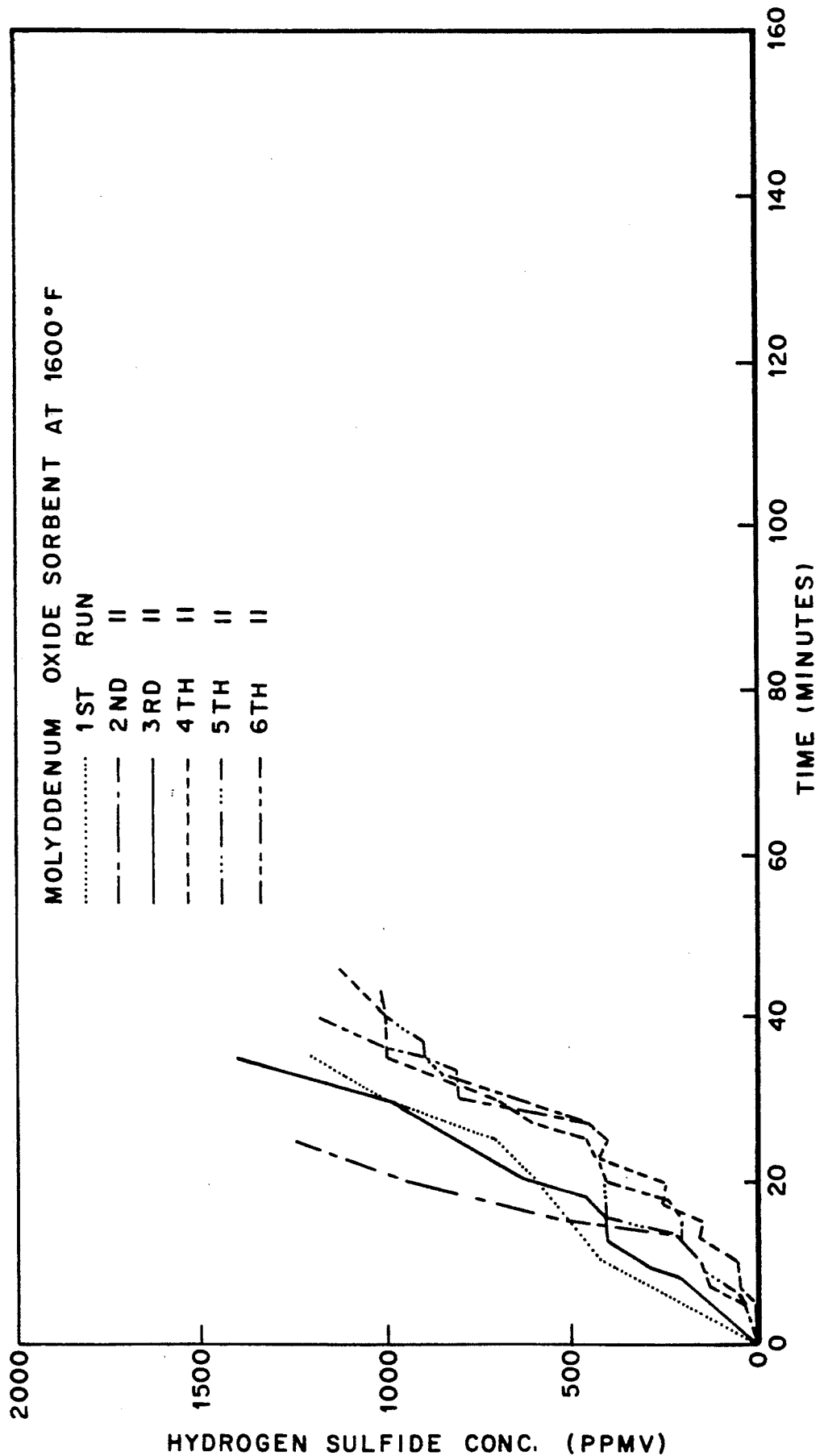
FIG. 2 is a graph showing the hydrogen sulfide breakthrough occurring at 1600° F. for a molybdenum oxide sorbent supported on a zeolite substrate over six sulfidation/regeneration cycles.
Figure 3:
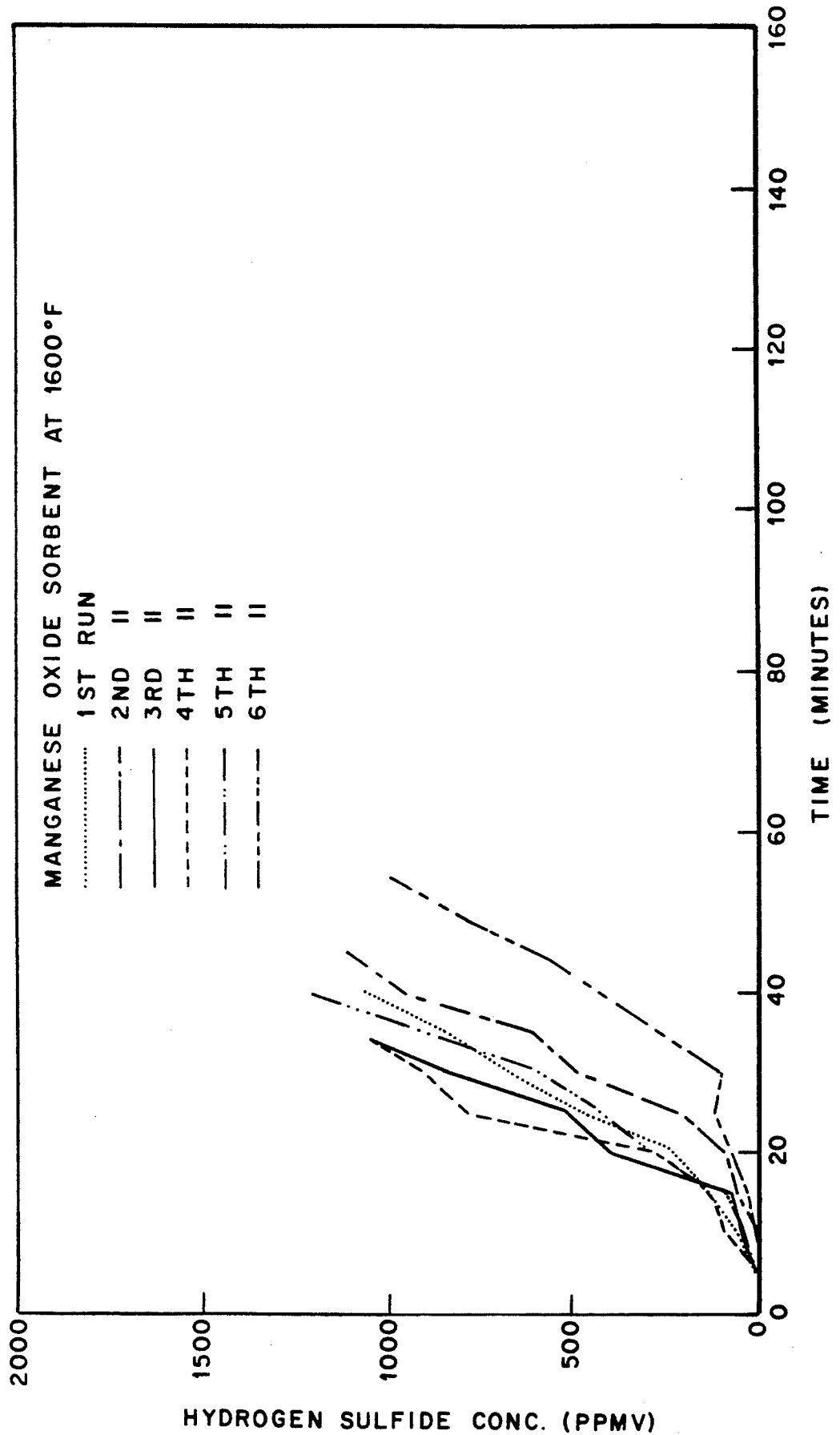
FIG. 3 is a graph illustrating the hydrogen sulfide breakthrough for six sulfidation/regeneration cycles at 1600° F. for a manganese oxide sorbent supported on a zeolite substrate.

During investigations leading to the present invention, several sorbent candidates including copper oxide, manganese oxide, and molybdenum oxide were each loaded on the aforementioned preferred zeolite by a wet impregnation technique, as will be described below, and then subjected to a process gas stream at 1600° F. over several sulfidation/regeneration cycles to determine the desulfurization and regeneration characteristics of each sorbent. The results of this testing are shown in FIGS. 1–3. These zeolite-supported sorbents contained 2.1 wt/% copper, 1.3 wt/% molybdenum, and 0.74 wt/% manganese in the form of metal oxides, which respectively corresponded to metal atomic ratios of 2.4:1.0:1.0. The process gas stream was of a gas composition generally corresponding to that obtainable from an air-blown gasifier of a type capable of providing hot gases for use in combined-cycle systems such as described above. The process gas stream possessed a molar composition of 42.5% nitrogen, 13.8% hydrogen, 12.5% carbon monoxide, 11% carbon dioxide, 1.0% methane, 19% water, and 0.2% hydrogen sulfide. The regeneration of these single oxide sorbents between sulfidation runs was achieved in a 50 mole %air/50mole % steam mixture at a space velocity at 600 $h^{-1}$. The sulfidation runs were conducted in the process gas stream with a space velocity of 2000 $h^{-1}$. The breakthrough times shown in FIGS. 1-3 were when the hydrogen sulfide content in the sorbent outlet gas reached 200 ppmv.

As shown in FIG. 1, the sulfur capacity per metal atom was much greater for the copper oxide than that for either the molybdenum oxide or the manganese oxide as shown in FIGS. 2 and 3 respectively. A sulfur analysis of the molybdenum oxide sorbent after the sixth sulfidation run showed that very little molybdenum sulfide had been formed. The reacted sorbent contained only 0.01-0.04% sulfur, providing only a slightly greater sulfur containment than the 0.01% sulfur contained in the fresh sorbent. The breakthrough curves for the manganese oxide show that this metal oxide is a more efficient sorbent than the molybdenum oxide but also considerably less efficient than the copper oxide.

These results notwithstanding, it was found that by combining copper oxide with manganese oxide and, preferably, with molybdenum oxide the efficiency and capacity of the sorbent was substantially increased over that obtainable by using the zeolite-supported copper oxide alone. This increase in efficiency and capacity was unexpected since, as illustrated in FIGS. 1-3, the molybdenum oxide and manganese oxide sorbents each had considerably less sulfur capacity than that of the copper oxide sorbent when exposed to similar sulfidation conditions. Thus, it is believed that the manganese oxide and the molybdenum oxide each function as a catalyst or a promoter for the reaction of hydrogen sulfide with the copper oxide.

The addition of manganese oxide to copper oxide increased the efficiency and capacity of the sorbent over copper oxide alone and was effective up to about 1400° F. However from about 1400° to 1600° F. the sulfur absorbing capability of binary copper oxide-manganese oxide sorbent dropped to where the outlet concentrations of hydrogen sulfide were about four times greater at 1600° F. than obtained at temperatures less than about 1400° F. This zeolite-supported binary sorbent is useful for desulfurization applications at temperatures higher than many of the previously utilized solid sorbents.

By adding to or replacing copper oxide with both manganese oxide and molybdenum oxide to provide a ternary Cu-Mn-Mo oxide sorbent proved to be a significant breakthrough. The addition of the molybdenum oxide provided a substantial improvement in the sulfur removal efficiency and capacity of the sorbent at 1600° F. This improvement was significant to such an extent that the ternary oxide sorbent was found to be readily capable of removing adequate concentrations of hydrogen sulfide from process gas streams at 1600° F. for the use of the ternary sorbent in combined cycle applications such as described above.

The mixed oxide sorbent containing copper, manganese and molybdenum oxides on a zeolite substrate of essentially silicon oxide is the preferred sorbent arrangement. This ternary metal oxide sorbent is satisfactorily prepared by employing a wet impregnation procedure. In this procedure a plurality of the aforementioned preferred zeolites were placed in a rotary vacuum evaporator and a vacuum was applied on the zeolites to remove air from the pores in the zeolites. An aqueous solution containing cupric acetate, ammonium molybdate and manganese acetate were added to the zeolites in the evaporator in sufficient quantities to provide molar ratios of 7:2:1 for the copper, molybdenum, and manganese respectively. The liquid portion of the solution was provided by one part of ammonium hydroxide to ten parts of deionized water. This solution was mixed with the zeolites at 70° C. for one hour until the solution became partially dehydrated. The coated zeolites were then fully dehydrated at 70° C. in a vacuum oven overnight and thereafter calcined at 900° C. for seven hours to yield the single-coated sorbent. Alternatively, the solution may be separated from the zeolites by employing a suitable conventional filtering technique rather than by dehydration. These wet impregnation steps were repeated three times to provide a sorbent with a weight composition, as determined by atomic absorption analysis, of 1.82% copper, 0.052% manganese, and 0.67% molybdenum in the form of metal oxides. The sorbent had a surface area of 304 $m^2/g$.

Figure 4:
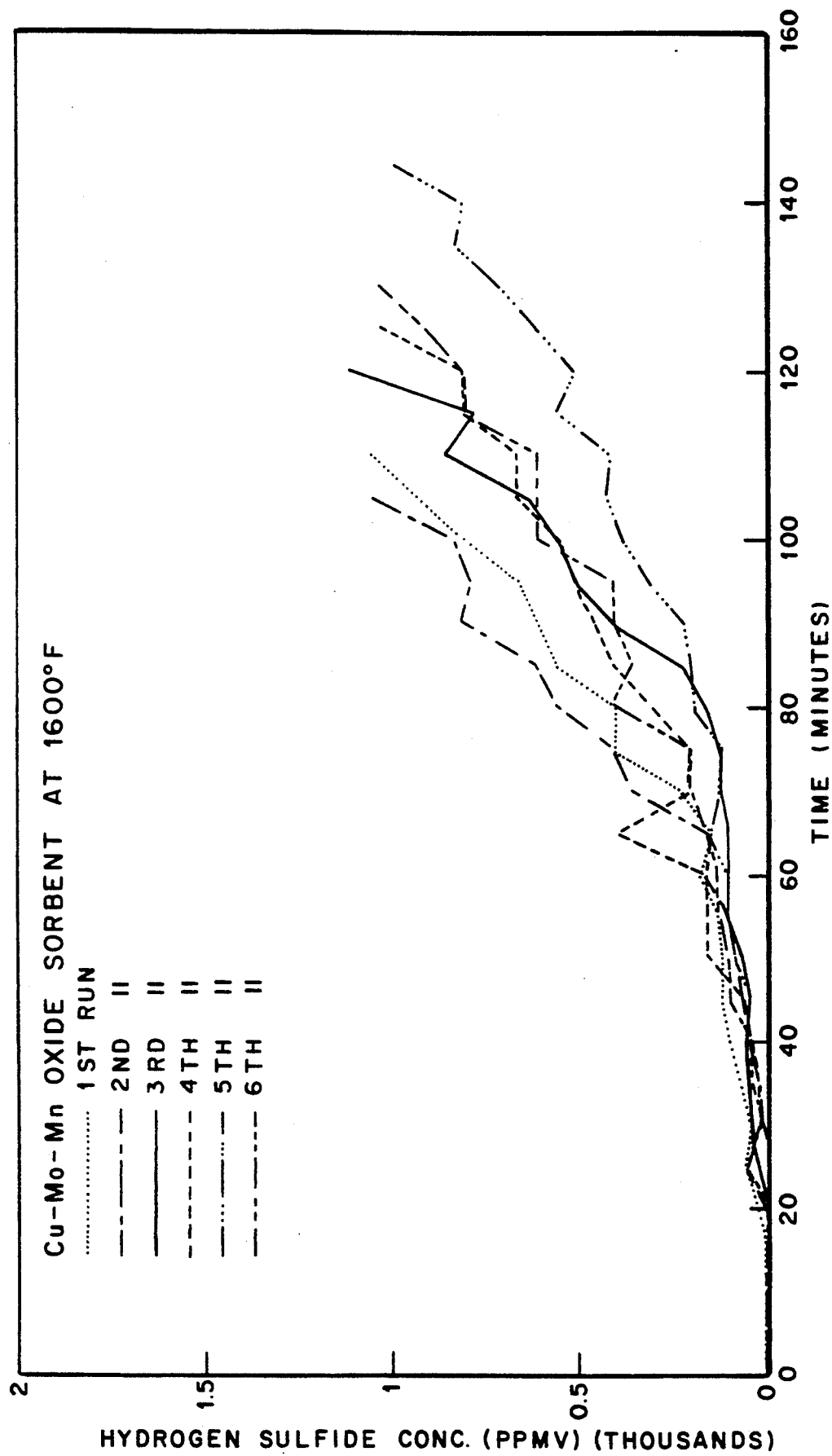
FIGS. 4 and 5 are graphs illustrating hydrogen sulfide breakthrough at 1600° F. for eleven sulfidation/regeneration cycles of a ternary copper oxide, manganese oxide, molybdenum oxide sorbent supported on a zeolite substantially formed of silicon oxide.
Figure 5:
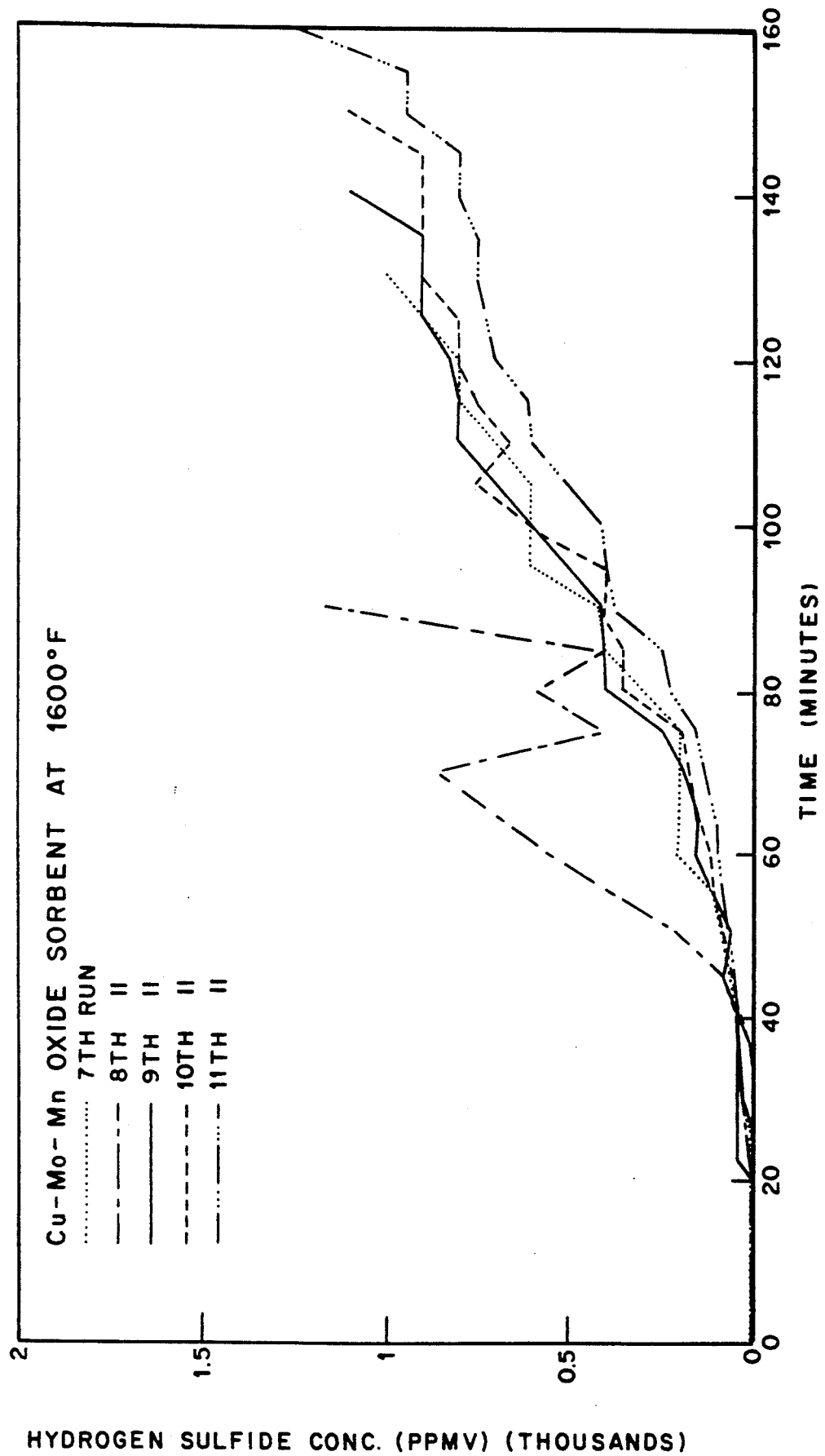

As shown in FIGS. 4 and 5, eleven sulfidation runs with sorbent regeneration between each run were made with the above described ternary oxide sorbent in a process gas stream having a gas composition generally corresponding to that provided by a coal gasifier and as described above at a space velocity of 2000 $h^{-1}$. The sorbent was regenerated between runs by using the aforementioned steam-air mixture at a space velocity of 600 $h^{-1}$. In these graphs, the outlet concentrations of hydrogen sulfide and sulfur dioxide were checked by using precision gas detection tubes. The concentrations of hydrogen sulfide, sulfur dioxide and carbonyl sulfide were determined by gas chromatographic analysis of gas samples taken at selected times during the sulfidation and regeneration runs. The hydrogen sulfide breakthrough curves illustrated in the drawings in the outlet gas versus time on-stream as determined by gas detection tubes showed that breakthrough times (defined as 200 ppmv in the outlet gas) for the ternary oxide sorbent were typically between 60 to 80 minutes.

Figure 6:
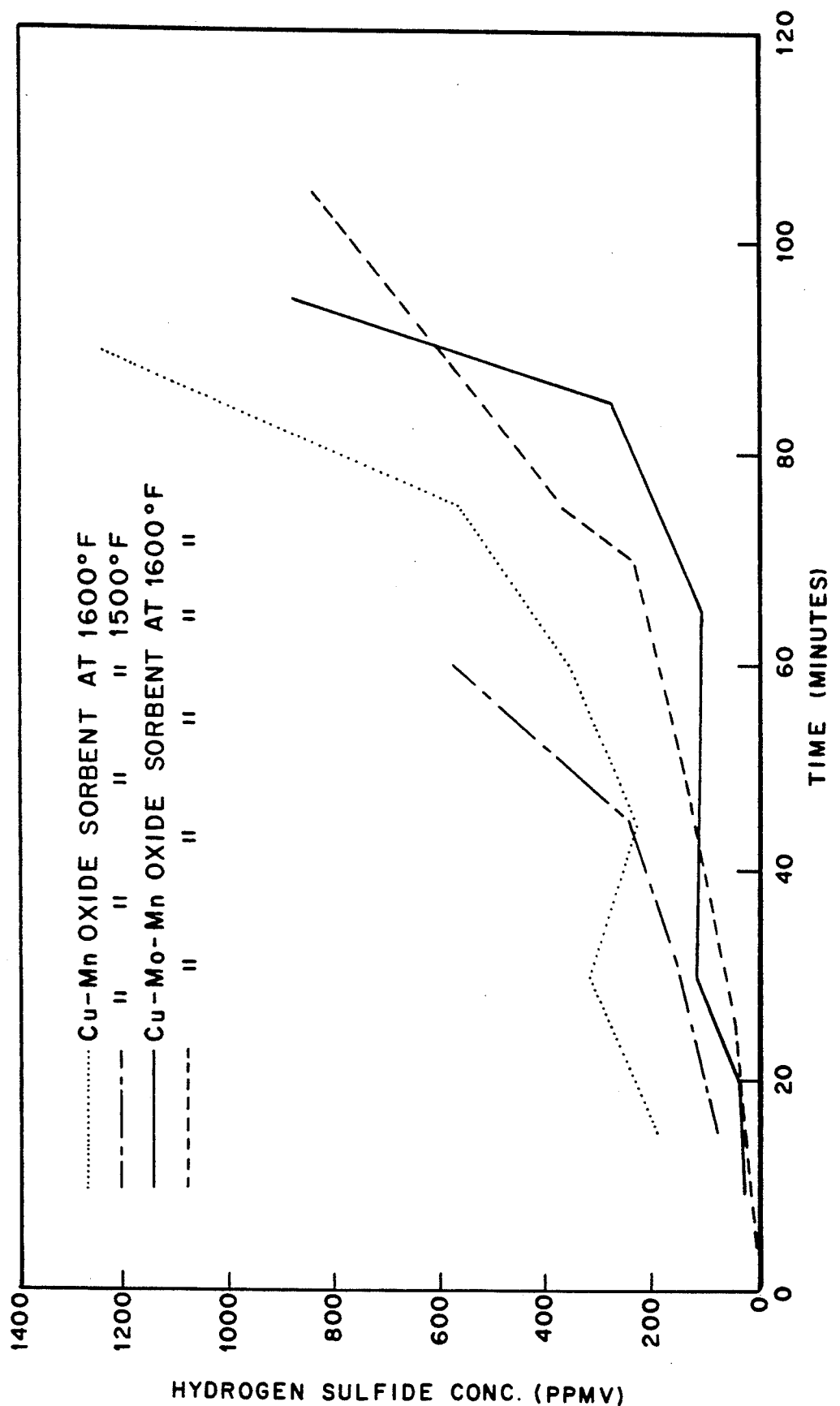
FIG. 6 is a graph comparing the hydrogen sulfide breakthrough times of a zeolite-supported binary copper oxide-manganese oxide sorbent at 1500° and 1600° F. with a ternary metal oxide sorbent as in FIGS. 4 and 5 at 1600° F.

FIG. 6 shows a comparison of the breakthrough times for a binary copper oxide-manganese oxide sorbent supported on the preferred zeolite and a ternary oxide sorbent supported on the preferred zeolite as prepared above. As shown in these graphs, the ternary oxide sorbent possesses considerably greater sorbing efficiency and sulfur capacity at 1600° F. than provided by the binary oxide sorbent at 500° F. and 1600° F.

The mixed metal oxide sorbents supported the substantially zeolite substrate in accordance with the present invention can be provided by the particular metal oxides in concentrations, by weight, of about 50% to about 98% copper as copper oxide, about 1-10% manganese as manganese oxide, and about 1-40% molybdenum as molybdenum oxide. With less than about 1% manganese and molybdenum, the reaction promoting effect provided by these metal oxides is insufficient to provide any noticeable improvement in the sulfur capacity of the copper oxide. The maximum concentration of the manganese is preferably maintained at a relatively low value as compared to that of the molybdenum oxide due to the formation of manganese sulfide during regeneration. Greater than about 40% molybdenum tends to reduce the efficiency of the sorbent since the concentration of the more efficient copper oxide is excessively reduced.

It was previously found that the copper oxide-molybdenum oxide sorbents were not particularly suitable for high temperature desulfurization applications since the molybdenum oxide was unstable at temperatures greater than about 1250° F. so as to result in a significant loss of molybdenum at elevated temperatures. However, by adding copper oxide to manganese oxide it was discovered that the manganese oxide sufficiently inhibited the volatilization of molybdenum oxide so as to significantly reduce the loss thereof at temperatures as high as 1600° F. Thus, a further embodiment of the multiple oxide sorbent of the present invention is provided by employing copper oxide with a molybdenum oxide concentration near the high end of the aforementioned range and with manganese oxide in a sufficient concentration to reduce the volatilization of the molybdenum oxide to acceptable levels.

The concentration of the metals forming the sorbent of the present invention is sufficient to provide about 3 to 20% of the combined weight of the zeolite and sorbent. Sorbent concentrations of greater than about 20% would substantially plug the porous surface of the zeolite so as to significantly reduce the surface area of the supported sorbent. On the other hand, with a concentration of sorbent less than about 3% the absorbing capacity would be so small as to require an excessively large sorbent bed for effective desulfurization of a process gas stream.

The metal oxide sorbents of the present invention a supported on predominantly silicon oxide zeolites can be used effectively through repeated runs as described above with these runs generally showing a trend to improved sulfur removal with each successive sulfidation/regeneration cycle up to about five sulfidation runs which can last for as long a about 80 minutes before breakthrough. After five cycles the efficiency slightly declines and then stabilizes from about the seventh through eleventh cycle as illustrated in FIGS. 4 and 5.

It will be seen that the present invention provides a highly satisfactory metal oxide sorbent supported on a silicon oxide substrate which is particularly suitable for use in a combined coal gasifier-turbine system and where the gases are generated in a gasifier such as a fluidized or entrained bed gasifier with the gas stream emanating from the gasifier at a temperature of about 1600° F. By using the sorbent of the present invention, the process gas streams could be essentially cleansed of sulfur compounds, especially hydrogen sulfide, at the described higher temperatures to allow for the efficient use of the residual heat in the gases for the operation of the turbine. The zeolite supported ternary oxide sorbents of the present invention are readily capable of withstanding temperatures at high as 1600° F. in both reducing and oxidizing atmospheres as respectively found in the sulfidation and regeneration cycles. Further, the zeolite supported metal oxide sorbents of the present invention have been found to have a significantly greater crush strength, as believed to be contributable to the manganese oxide, than the bulk metal oxides after several cycles of sulfidation-regeneration and are thus expected to have a considerably greater life than many known sorbents in commercial applications.

What is claimed is:

1. A sorbent for removing hydrogen sulfide values from a process gas stream at elevated temperatures consisting essentially of a mixture of copper oxide with an effective amount of manganese oxide to promote the reaction of hydrogen sulfide with the copper oxide and with an effective amount of molybdenum oxide to promote the reaction of hydrogen sulfide with the copper oxide and the manganese oxide and to increase the hydrogen sulfide absorbing capacity of the sorbent, and a substrate supporting said mixture, said substrate is substantially formed of silicon oxide or a zeolite substantially formed of silicon oxide.

2. A sorbent as claimed in claim 1, wherein the mixture contains at least 50 weight percent copper oxide, at least 1 weight percent manganese oxide, and at least 1 weight percent molybdenum oxide.

3. A sorbent as claimed in claim 1, wherein the copper in the form of copper oxide is in a concentration in the range of 50 to about 98 weight percent of the mixture, wherein the effective amount of manganese in the form of manganese oxide in the mixture is in the range of about 1 to about 10 weight percent, and wherein the effective amount of molybdenum in the form of molybdenum oxide in the mixture is in the range of about 1 to about 40 weight percent.

4. A sorbent as claimed in claim 1, wherein the substrate is the zeolite, and wherein said zeolite is porous and contains greater than about 75 weight percent silicon oxide.

5. A sorbent as claimed in claim 4, wherein the sorbent mixture supported on the substrate is porous zeolite provides about 3 to about 20 weight percent of the combined weight of the sorbent and the zeolite substrate.

6. A sorbent for removing hydrogen sulfide values from a high temperature process gas stream containing such values, consisting essentially of a mixture of copper oxide, molybdenum oxide in a concentration effective to promote the reaction of hydrogen sulfide with the copper oxide, and manganese oxide in a concentration effective to inhibit volatilization of the molybdenum oxide, and a zeolite substrate substantially formed of silicon oxide supporting the mixture.

7. A sorbent as claimed in claim 6, wherein the concentration of manganese oxide is in the range of about 1 to 10 weight percent of the mixture, wherein the copper oxide is in the mixture in a concentration in the range of about 50 to 98 weight percent, and wherein the molybdenum oxide in the mixture is in a concentration in the range of about 1–40 weight percent.

8. A sorbent as claimed in claim 7, wherein the substrate is a porous zeolite containing greater than about 75 weight percent silicon oxide.

9. A sorbent as claimed in claim 8, wherein the sorbent mixture supported by the porous zeolite provides about 3 to about 20 percent of the total weight of the sorbent and the zeolite substrate.

* * * * *